(12) United States Patent
Yang et al.

(10) Patent No.: US 10,091,661 B2
(45) Date of Patent: Oct. 2, 2018

(54) METHOD FOR RECEIVING A DISCOVERY SIGNAL FROM A LAA BASED CELL

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 15/236,161

(22) Filed: Aug. 12, 2016

(65) Prior Publication Data

US 2017/0048690 A1 Feb. 16, 2017

Related U.S. Application Data

(60) Provisional application No. 62/204,448, filed on Aug. 13, 2015.

(51) Int. Cl.
*H04W 16/14* (2009.01)
*H04W 48/12* (2009.01)
*H04L 5/00* (2006.01)
*H04W 48/20* (2009.01)

(52) U.S. Cl.
CPC ........... *H04W 16/14* (2013.01); *H04L 5/0041* (2013.01); *H04L 5/0055* (2013.01); *H04L 5/0057* (2013.01); *H04W 48/12* (2013.01); *H04W 48/20* (2013.01)

(58) Field of Classification Search
None
See application file for complete search history.

(56) References Cited

U.S. PATENT DOCUMENTS

| 2016/0050637 | A1* | 2/2016 | Behravan | H04W 56/001 370/350 |
| 2016/0135179 | A1* | 5/2016 | Yin | H04J 11/0069 370/329 |
| 2017/0085346 | A1* | 3/2017 | Tiirola | H04W 28/26 |

* cited by examiner

*Primary Examiner* — Edan Orgad
*Assistant Examiner* — Saumit Shah
(74) *Attorney, Agent, or Firm* — Birch, Stewart, Kolasch & Birch, LLP

(57) ABSTRACT

One disclosure of the present specification provides a method for receiving a discovery signal from a license assisted access (LAA) based cell operating in an unlicensed band. The method may be performed by a user equipment (UE) and comprise: receiving a discovery signal measurement timing configuration (DMTC) including information on a periodicity of the DMTC and information on an occasion duration of a discovery signal. Here, if the UE operate in a bandwidth of 10 Mhz, the occasion duration may include a first subframe and a second subframe. The method may comprise: performing a cell detection for the LAA based cell operating in the unlicensed band, on the first subframe of the occasion duration; and performing measurements for the LAA based cell operating in the unlicensed band, on the second subframe of the occasion duration.

14 Claims, 20 Drawing Sheets

METHOD FOR RECEIVING A DISCOVERY SIGNAL FROM A LAA BASED CELL

CROSS-REFERENCE TO RELATED APPLICATION

This application claims the benefit of priority of U.S. Provisional Application No. 62/204,448 filed on Aug. 13, 2015, which is incorporated by reference in its entirety herein.

BACKGROUND OF THE INVENTION

Field of the Invention
The Present Invention Relates to Mobile Communication.
Related Art
3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

In a next-generation mobile communication system, it is expected that a small cell having a small cell coverage radius will be added to the coverage of an existing cell and a small cell will process more traffic.

However, if small cells within the coverage of a macro cell are densely deployed, it may be difficult for UE to detect the small cells within a short time.

In order to solve this problem, small scale cells may transmit a new discovery signal (DS) in addition to the existing PSS/SSS. Hence, the UE may identify small scale cells by using the discovery signal.

Further, as more communication devices require large communication capacity, efficient utilization of the restricted frequency band in the next generation is becoming a more important requirement.

A cellular communication system such as an LTE system is considering a method of utilizing an unlicensed band such as 2.4 GHz band which used by the existing IEEE 802.11 system, that is, the wireless local area network (WLAN) and an unlicensed band such as 5 GHz which is newly drawing attention, in the traffic offloading.

Basically, the unlicensed band assumes the scheme of wirelessly transmission and reception through the competition between respective communication nodes, and thus it requires confirming whether another communication has not transmitted signals by performing channel sensing before each communication node transmits signals. This is called a clear channel assessment (CCA), and the eNodeB or user equipment (UE) of the LTE system may also need to perform CCA for signal transmission in the unlicensed band.

However, the neighboring node of IEEE 802.11 system transmits signals, and thus when the CCA is not confirmed, the small scale cell cannot transmit the discovery signal. In other words, the small scale cell cannot transmit the discovery signal if it is determined that the signal size of the neighboring node based on IEEE 802.11 system is a threshold or greater.

As such, if the discovery signal cannot be periodically transmitted and is only intermittently transmitted (e.g., the discovery signal may be absent during tens of continuous periods), the UE cannot quickly identify the small scale cell.

SUMMARY OF THE INVENTION

Accordingly, the disclosure of this specification is to solve the aforementioned problem.

In order to achieve the aforementioned purpose, one disclosure of the present specification provides a method for receiving a discovery signal from a license assisted access (LAA) based cell operating in an unlicensed band. The method may be performed by a user equipment (UE) and comprise: receiving a discovery signal measurement timing configuration (DMTC) including information on a periodicity of the DMTC and information on an occasion duration of a discovery signal. Here, if the UE operate in a bandwidth of 10 Mhz, the occasion duration may include a first subframe and a second subframe. The method may comprise: performing a cell detection for the LAA based cell operating in the unlicensed band, on the first subframe of the occasion duration; and performing measurements for the LAA based cell operating in the unlicensed band, on the second subframe of the occasion duration.

The cell detection and the measurement may be completed for one duration defined by the information on the occasion duration.

The method may further comprise: performing a cell identification based on the cell detection and the measurement for one duration defined by the information on the occasion duration.

The first subframe of the occasion duration may include a primary synchronization signal (PSS), a secondary synchronization signal (SSS) and a cell-specific reference signal (CRS). Also, the second subframe of the occasion duration may include the CRS.

If the UE operate in a bandwidth of 5 Mhz, the occasion duration may include at least 4 subframes. Here, a first subframe of the at least 4 subframes may include at least one of a PSS, a SSS and a CRS. Also, second, third and fourth subframes of the at least 4 subframes may include the CRS.

The measurements for the LAA based cell may be performed on the second, third and fourth subframes.

In order to achieve the aforementioned purpose, one disclosure of the present specification provides also a user equipment (UE) for receiving a discovery signal from a license assisted access (LAA) based cell operating in an unlicensed band. The UE may comprise a transceiver configured to receive a discovery signal measurement timing configuration (DMTC) including information on a periodicity of the DMTC and information on an occasion duration of a discovery signal. Here, if the UE operate in a bandwidth of 10 Mhz, the occasion duration includes a first subframe and a second subframe. The UE may comprise: a processor configured to: perform a cell detection for the LAA based cell operating in the unlicensed band, on the first subframe of the occasion duration, and perform measurements for the LAA based cell operating in the unlicensed band, on the second subframe of the occasion duration.

In accordance with the disclosure of this specification, the aforementioned conventional problem is solved.

DESCRIPTION OF EXEMPLARY EMBODIMENTS

Figure 1:
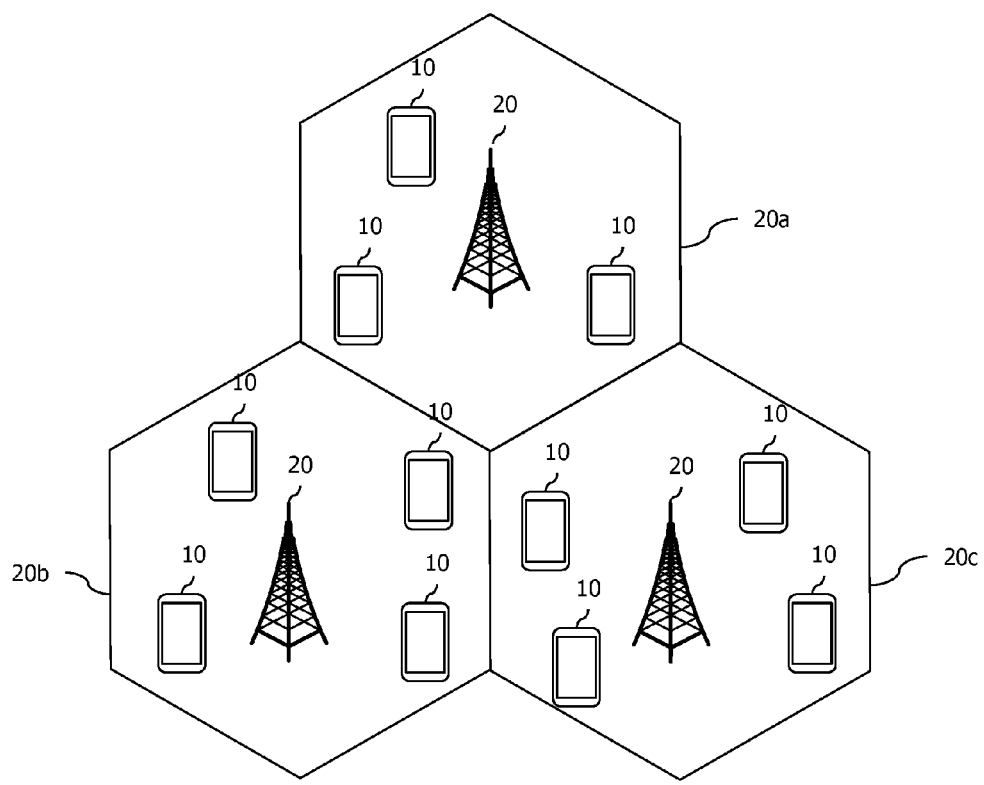
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

Furthermore, UE (user equipment) used herein may be fixed or may have mobility and may be called another term, such as a device, a wireless device, a terminal, an MS (mobile station), a UT (user terminal), an SS (subscriber station), or an MT (mobile terminal).

As used herein, 'user equipment (UE)' may be stationary or mobile, and may be denoted by other terms such as device, wireless device, terminal, MS (mobile station), UT (user terminal), SS (subscriber station), MT (mobile terminal) or other name.

FIG. 1 Shows a Wireless Communication System.

The wireless communication system includes at least one base station (BS) 20. Respective BSs 20 provide a communication service to particular geographical areas 20a, 20b, and 20c (which are generally called cells). Each cell may be divided into a plurality of areas (which are called sectors).

The UE generally belongs to one cell and the cell to which the UE belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
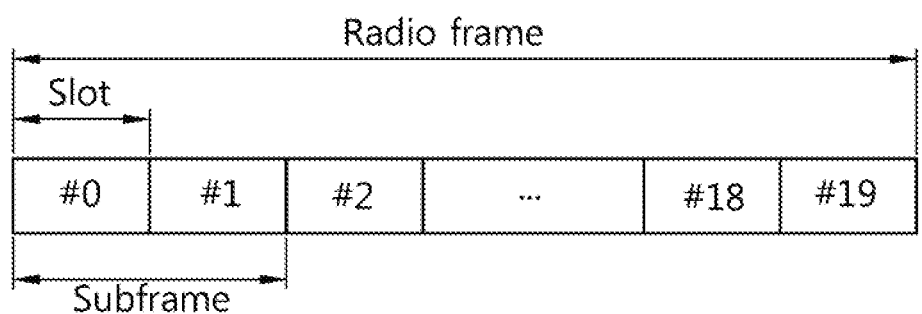
FIG. 2 illustrates the structure of a radio frame according to FDD in 3GPP LTE.

FIG. 2 Shows a Downlink Radio Frame Structure According to FDD of 3rd Generation Partnership Project (3GPP) Long Term Evolution (LTE).

For the radio frame shown in FIG. 2, 3GPP (3rd Generation Partnership Project) TS 36.211 V10.4.0 (2011-12) "Technical Specification Group Radio Access Network; Evolved Universal Terrestrial Radio Access (E-UTRA); Physical channels and modulation (Release 8)", Ch. 5 may be referenced.

The structure of a radio frame is merely an example, and the number of sub-frames included in the radio frame or the number of slots included in a sub-frame may vary differently.

Meanwhile, one slot may include a plurality of OFDM symbols. The number of OFDM symbols included in one slot may vary depending on a cyclic prefix (CP). In particular, in 3GPP LTE, it is defined such that 7 OFDM symbols are included in one slot in a normal CP case, and 6 OFDM symbols are included in one slot in an extended CP case. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Figure 3:
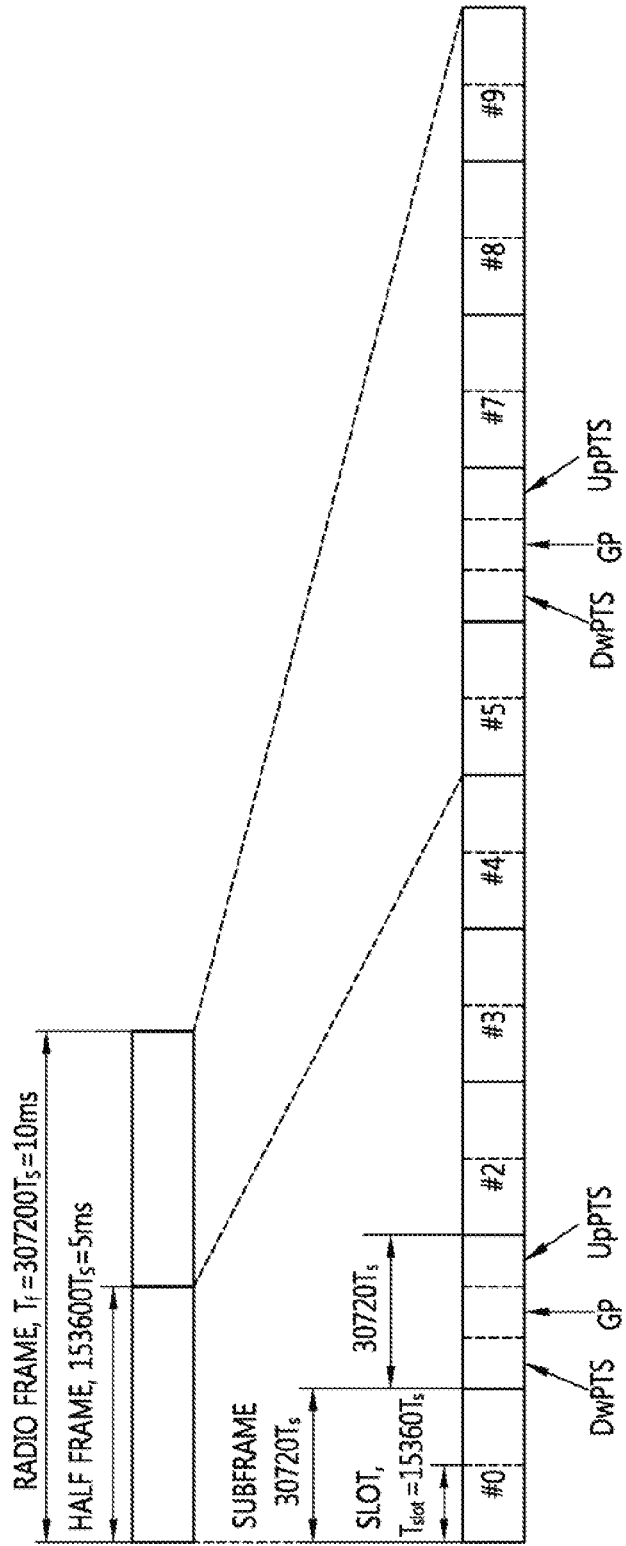
FIG. 3 illustrates the structure of a downlink radio frame according to TDD in 3GPP LTE.

FIG. 3 Illustrates the Architecture of a Downlink Radio Frame According to TDD in 3GPP LTE.

3GPP (3rd Generation Partnership Project) TS 36.211 V10.4.0 (2011-12) "Technical Specification Group Radio Access Network; Evolved Universal Terrestrial Radio Access (E-UTRA); Physical channels and modulation (Release 10)", Ch. 4 may be referenced.

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Config- uraiton | Switch- point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |

TABLE 2-continued

| | Normal CP in downlink | | | Extended CP in downlink | | |
| | | UpPTS | | | UpPTS | |
| Special subframe configuration | DwPTS | Normal CP in uplink | Extended CP in uplink | DwPTS | Normal CP in uplink | Extended CP in uplink |
| --- | --- | --- | --- | --- | --- | --- |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
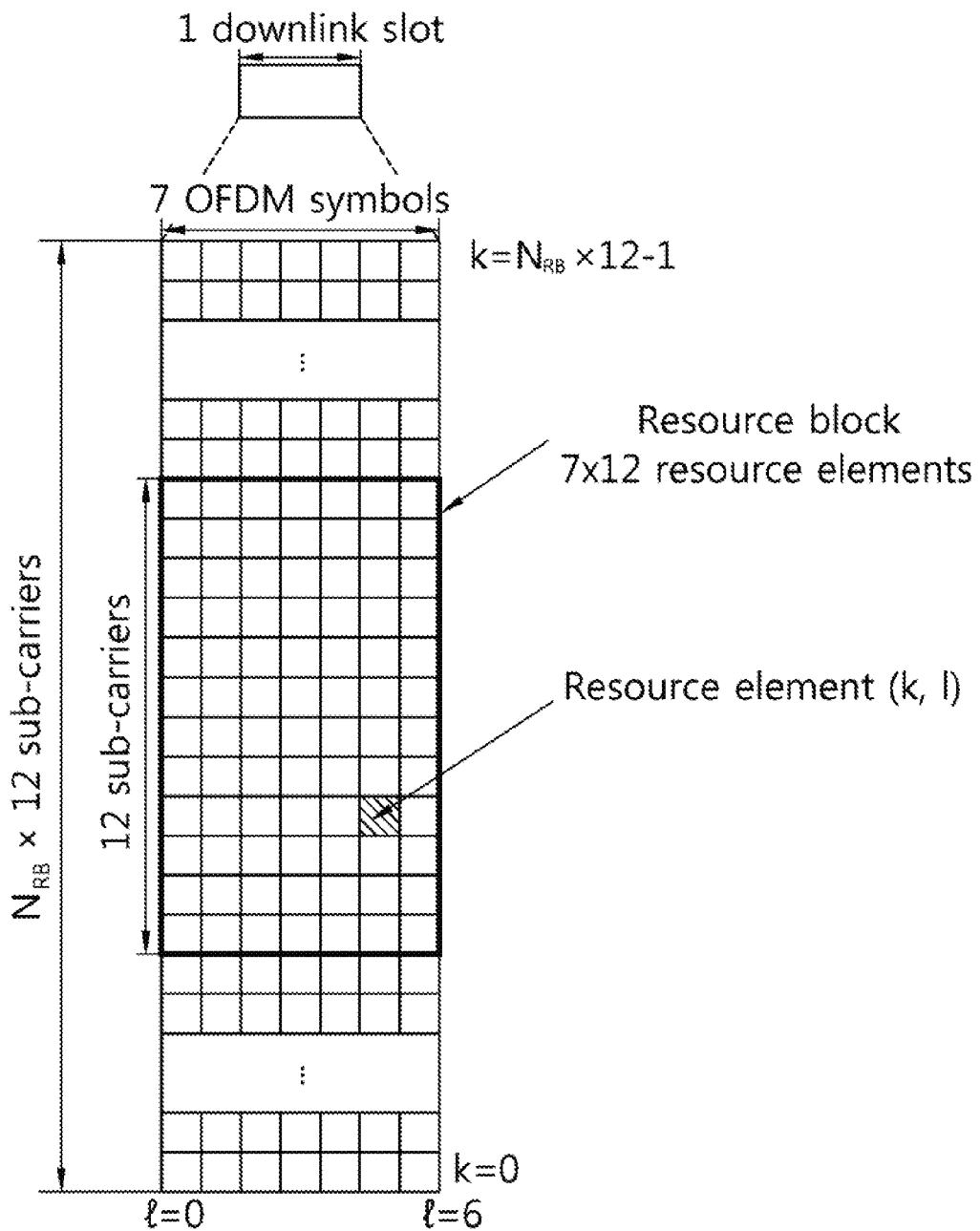
FIG. 4 is an exemplary diagram illustrating a resource grid for a single uplink or downlink slot in 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
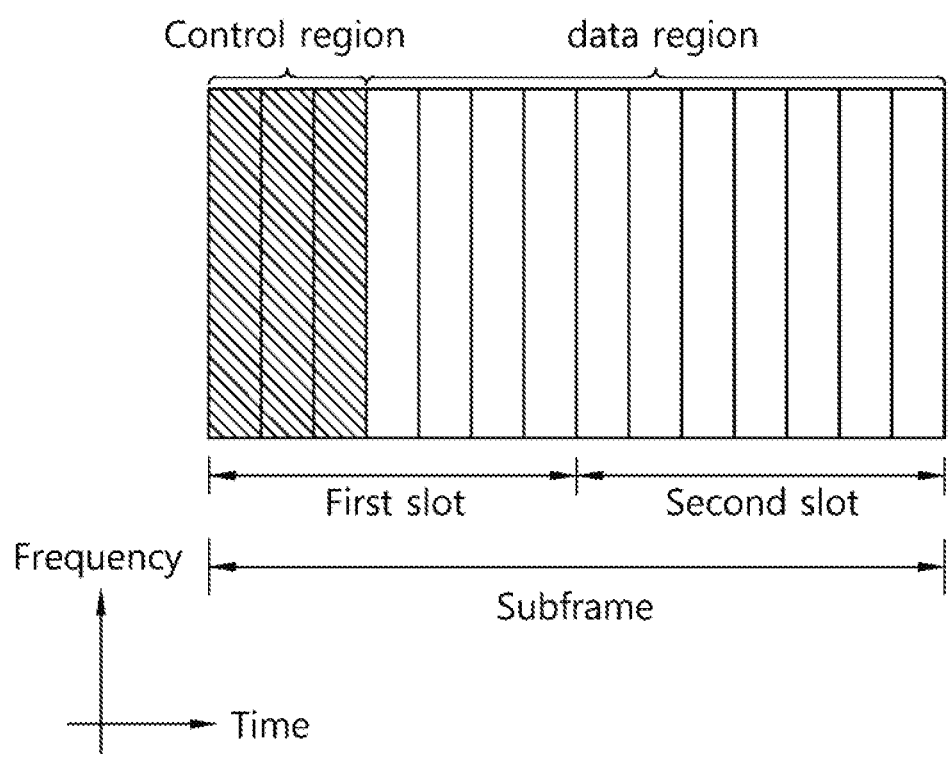
FIG. 5 illustrates the structure of a downlink subframe.

FIG. 5 Illustrates the Architecture of a Downlink Sub-Frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
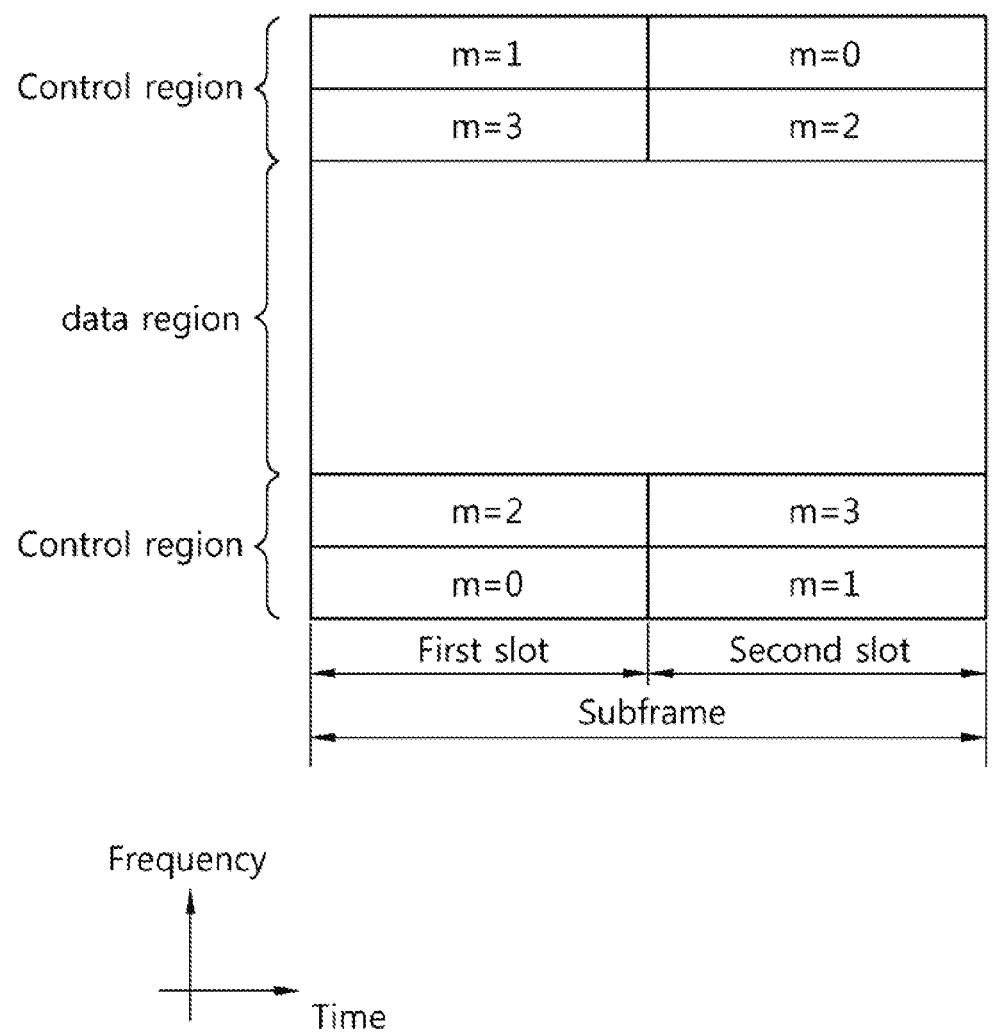
FIG. 6 illustrates the structure of an uplink subframe in 3GPP LTE.

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

A resource block pair (RB pair) is allocated to a PUCCH for one UE in a subframe. Resource blocks belonging to a resource block pair occupy different subcarriers in a first slot and a second slot. A frequency occupied by resource blocks belonging to a resource block pair allocated to a PUCCH is changed based on a slot boundary. This is said that the RB pair allocated to the PUCCH has been frequency-hopped in the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel state information (CSI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH. Examples of the control information to be multiplexed with data may include a channel quality indicator (CQI), a precoding matrix indicator (PMI), HARQ, a rank indicator (RI), etc. Alternatively, the uplink data may consist of only the control information.

<Carrier Aggregation (CA)>

A carrier aggregation system is described below.

A carrier aggregation system means that a plurality of component carriers (CC) is aggregated. The meaning of an existing cell has been changed by such a carrier aggregation. In accordance with the carrier aggregation, a cell may mean a combination of downlink CCs and uplink CCs or a single downlink CC.

Furthermore, in the carrier aggregation, cells may be divided into a primary cell, a secondary cell, and a serving cell. The primary cell means a cell operating in a primary frequency, a cell in which UE performs an initial connection establishment procedure or connection reestablishment process on an eNodeB, or a cell designated as a primary cell in a handover process. The secondary cell means a cell operating in a secondary frequency. If an RRC connection is set up, the secondary cell is configured and used to provide additional radio resources.

As described above, in a carrier aggregation system, a plurality of component carrier (CC), that is, a plurality of serving cells, can be supported unlike in a single carrier system.

Such a carrier aggregation system can support cross-carrier scheduling. Cross-carrier scheduling is a scheduling method for allocating the resource of a PDSCH transmitted through another component carrier and/or allocating the resource of a PUSCH transmitted through a component carrier other than a component carrier basically linked to a specific component carrier, through a PDCCH transmitted through the specific component carrier.

<Synchronization Signal>

In LTE/LTE-A systems, synchronization with a cell is obained through a synchronization signal (SS) in a cell search process.

The synchronization signal is described in detail below with reference to FIG. 7.

Figure 7:
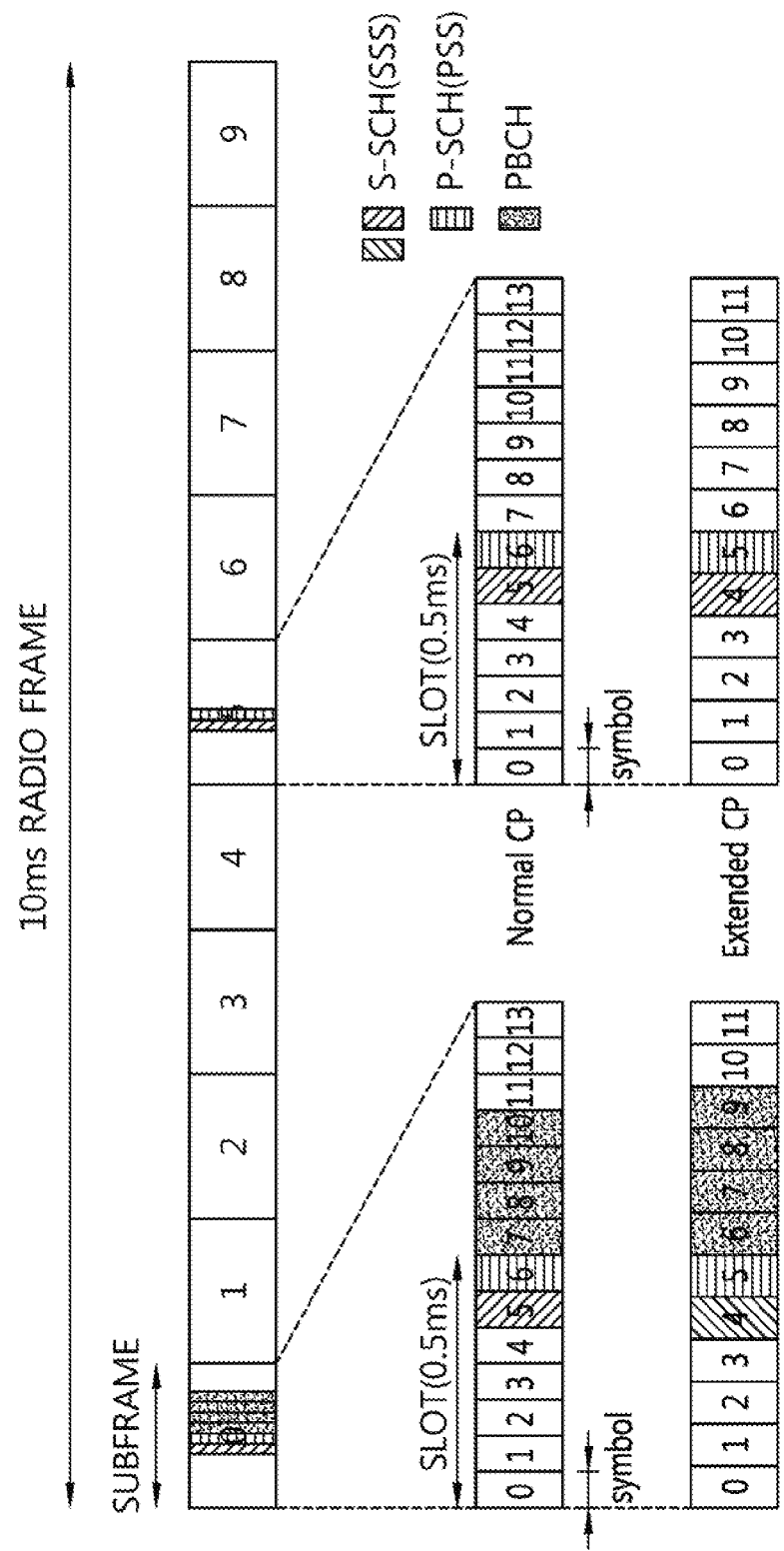
FIG. 7 illustrates a frame structure for the transmission of a synchronization signal in an FDD frame.

FIG. 7 Illustrates a Frame Structure for the Transmission of a Synchronization Signal in an FDD Frame.

A slot number and a subframe number starts with 0. UE may perform time and frequency synchronization based on a synchronization signal received from an eNodeB. In 3GPP LTE-A, a synchronization signal is used for cell search and may be divided into a primary synchronization signal (PSS) and a secondary synchronization signal (SSS). In 3GPP LTE-A, for a synchronization signal, reference may be made to Paragraph 6.11 of 3GPP TS V10.2.0 (2011-06).

A PSS is used to obtain OFDM symbol synchronization or slot synchronization and associated with a physical-layer cell identity (PCI). Furthermore, an SSS is used to obtain frame synchronization. Furthermore, an SSS is used to detect a CP length and to obtain a physical layer cell group ID.

A synchronization signal may be transmitted in a subframe No. 0 and a subframe No. 5 several time by taking into consideration 4.6 ms, that is, the length of a GSM (global system for mobile communication) frame in order to facilitate inter-RAT (radio access technology) measurement. The boundary of the frame may be detected through an SSS. More specifically, in an FDD system, a PSS is transmitted in the last OFDM symbol of a slot No. 1 or a slot No. 10, and an SSS is transmitted in an OFDM symbol right before a PSS.

A synchronization signal may send any one of a total of 504 physical cell IDs through a combination of three PSSs and 168 SSSs. A PBCH (physical broadcast channel) is transmitted in the first 4 OFDM symbols of the first slot. A synchronization signal and PBCH are transmitted within center 6 Rbs within a system bandwidth so that UE can detect or demodulate the synchronization signal regardless of a transmission bandwidth. A physical channel in which a PSS is transmitted is called a P-SCH, and a physical channel in which an SSS is transmitted is called an S-SCH.

Figure 8:
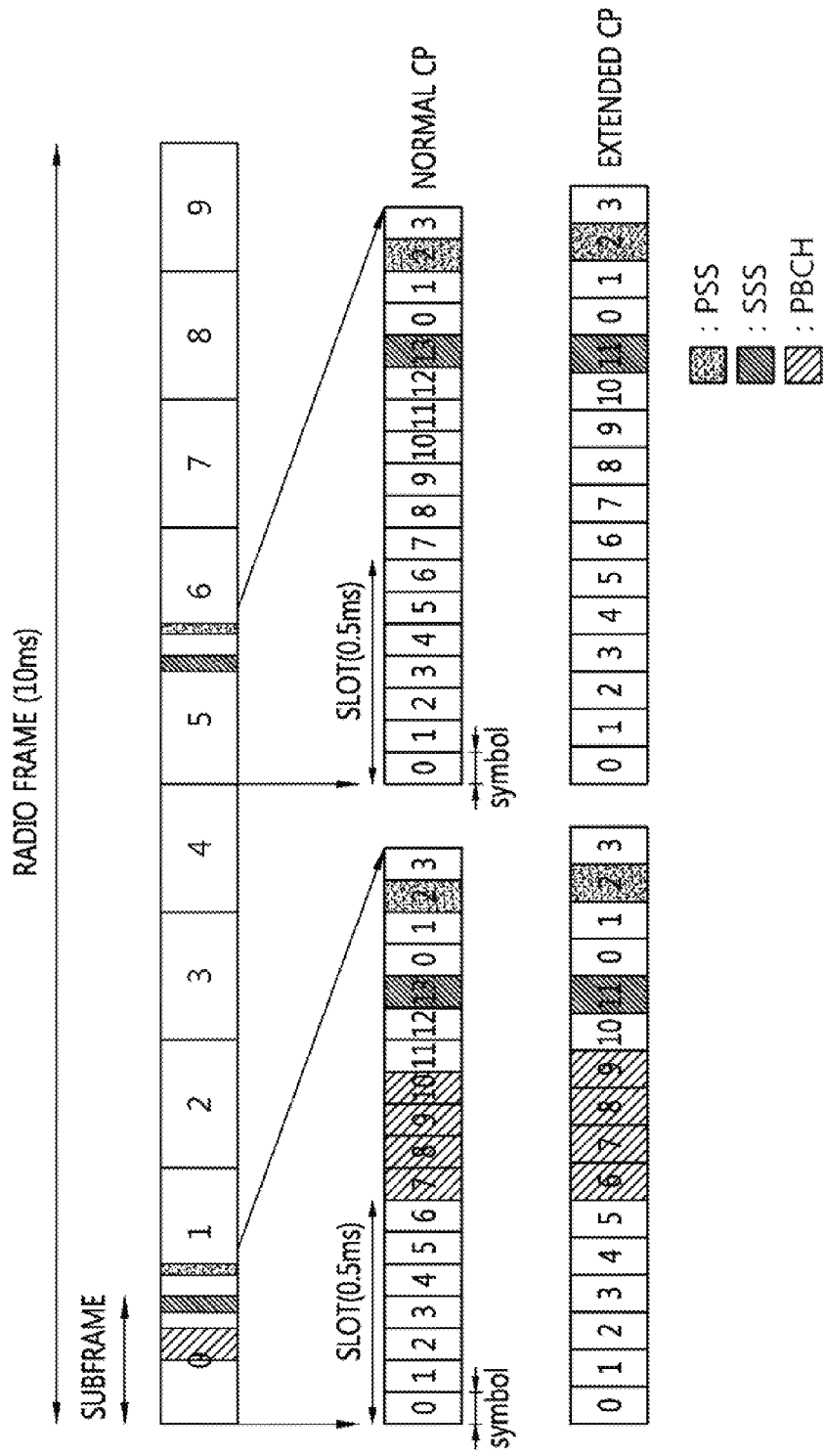
FIG. 8 illustrates an example of a frame structure for sending a synchronization signal in a TDD frame.

FIG. 8 Illustrates an Example of a Frame Structure for Sending a Synchronization Signal in a TDD Frame.

In a TDD frame, a PSS is transmitted in the third OFDM symbols of a third slot and thirteenth slot. An SSS is transmitted prior to three OFDM symbols in OFDM symbols in which a PSS is transmitted. A PBCH is transmitted in the first 4 OFDM symbols of a second slot in the first subframe.

<Reference Signal>

A RS is described below.

In general, transmission information, for example, data is easily distored and changed while it is transmitted through a radio channel. Accordingly, a reference signal is required in order to demodulate such a transmission information without an error. The reference signal is a signal known to both a transmitter and a receiver and is transmitted along with transmission information. Since transmission information transmitted by a transmitter experiences a corresponding channel for each transmission antennaor layer, a reference signal may be allocated to each transmission antenna or layer. A reference signal for each transmission antenna or layer layer may be identified using resources, such as a frequency and code. A reference signal may be used for two purposes, that is, the demodulation and channel estimation of transmission information.

A downlink reference signal may be divided into a cell-specific reference signal (CRS), an MBSFN (multimedia broadcast and multicast single frequency network) reference signal, a UE-specific reference signal (UE-specific RS, URS), a positioning reference signal (positioning RS, PRS), and a CSI reference signal (CSI-RS). The CRS is a reference signal transmitted to all UEs within a cell and also called a common reference signal. The CRS may be used for the channel measurement of CQI feedback and the channel estimation of PDSCH. The MBSFN reference signal may be transmitted in a subframe allocated for MBSFN transmission. The URS is a reference signal received by a specific UE or specific UE group within a cell and may be called a demodulation reference signal (DM-RS). The DM-RS is chiefly used for a specific UE or specific UE group to perform data demodulation. The PRS may be used to estimate the location of UE. The CSI-RS is used for the channel estimation of the PDSCH of LTE-A UE. The CSI-RSs are deployed relatively sparsely in a frequency domain or time domain and may be punctured in the data region of a common subframe or MBSFN subframe.

Figure 9:
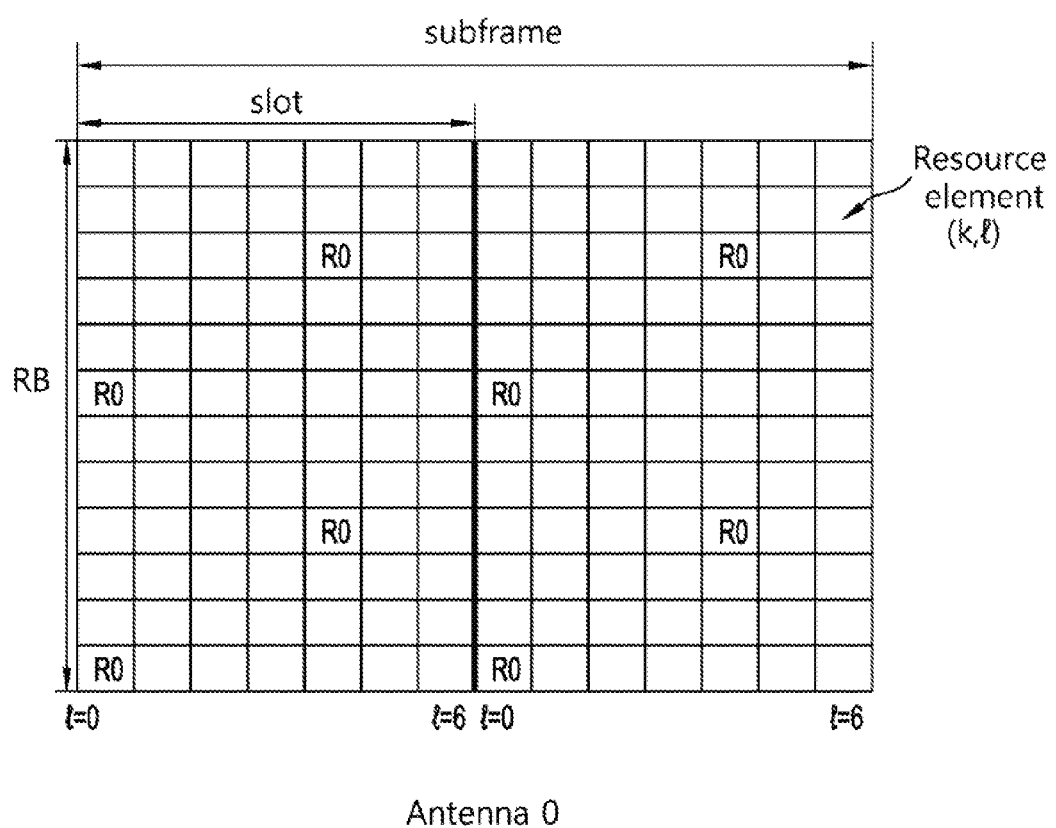
FIG. 9 illustrates an example of a pattern in which CRSs are mapped to RBs if an eNodeB uses a single antenna port.

FIG. 9 Illustrates an Example of a Pattern in which CRSs are Mapped to RBs if an eNodeB Uses a Single Antenna Port.

Referring to FIG. 9, R0 illustrates an RE to which a CRS transmitted by the antenna port number 0 of an eNodeB is mapped.

CRS is transmitted in all downlink subframes within a cell which supports PDSCH transmission. CRS may be transmitted on antenna ports 0 to 3.

The resource element (RE), which is allocated to the CRS of one antenna port, cannot be used in transmission of other antenna ports and need to be set to zero. Further, in the multicast-broadcast single frequency network (MBSFN) subframe, CRS is transmitted in only non-MBSFN area.

Figure 10:
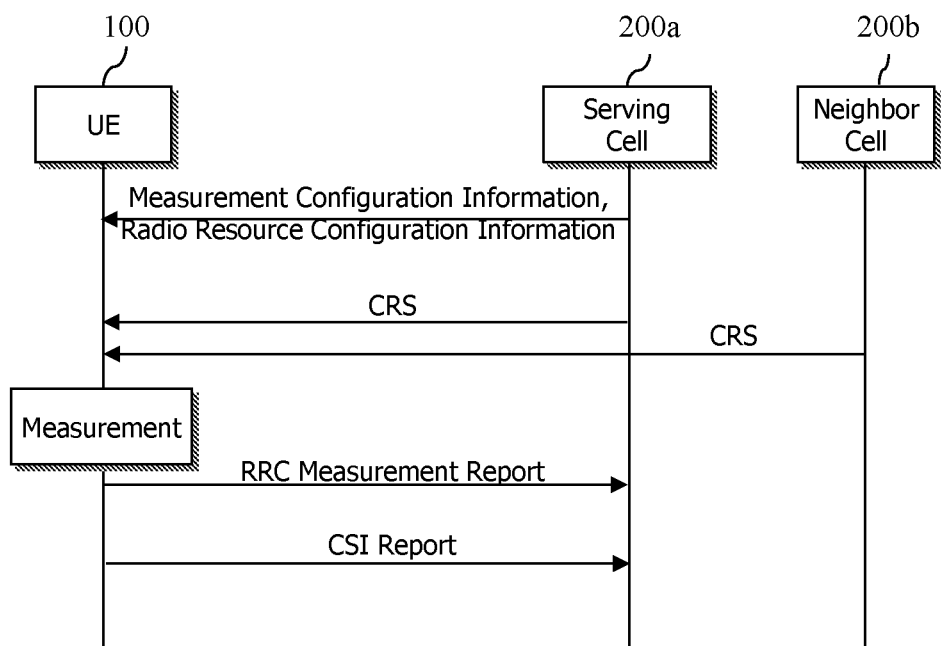
FIG. 10 illustrates measurement and measurement report procedures.

FIG. 10 Illustrates Measurement and Measurement Report Procedures.

In a mobile communication system, a mobility support for UE 100 is essential. Accordingly, the UE 100 continues to measure quality of a serving cell that now provides service to the UE 100 and quality of neighbor cells. The UE 100 reports a measurement result to a network at a proper time, and the network provides optimal mobility to the UE through handover. Measurement for such a purpose is called radio resource management (RRM).

The UE 100 may monitor downlink quality of a primary cell (Pcell) based on a CRS. This is called RLM (Radio Link Monitoring). For such RLM, the UE 100 estimates downlink quality and compares the estimated downlink quality with thresholds, for example, Qout and Qin. The threshold Qout is defined as a level in which downlink reception cannot be stably performed, and corresponds to an 10% error of PDCCH transmission by taking into consideration a PCFICH error. The threshold Qin is defined as a level in which downlink may be very significantly reliable compared to the threshold Qout, and corresponds to an 2% error of PDCCH transmission by taking into consideration a PCFICH error.

As may be seen with reference to FIG. 10, when a serving cell 200a and a neighbor cell 200b send respective CRSs (Cell-specific Reference Signals) to the UE 100, the UE 100 performs measurement through the CRSs and sends an RRC measurement report message, including a measurement result, to the serving cell 200a.

In this case, the UE 100 may perform measurement using the following three methods.

1) RSRP (reference signal received power): This indicates the mean reception power of all REs that carry a CRS transmitted in the entire band. In this case, the mean reception power of all REs that carry a CSI RS instead of the CRS may be measured.

2) An RSSI (received signal strength indicator): this indicates reception power measured in the entire band. The RSSI includes all of a signal, interference, and thermal noise.

3) RSRQ (reference symbol received quality): this indicates a CQI, and may be determined to be an RSRP/RSSI according to a measurement bandwidth or subband. That is, the RSRQ means an SINR (signal-to-noise interference ratio). The RSRP does not provide sufficient mobility information, and thus RSRQ may be used in a handover or cell reselection process instead of RSRP.

RSRQ may be an RSSI/RSSP.

For the measurement, the UE 100 receives a measurement configuration (hereinafter also called "measconfing") information element (IE) from the serving cell 100a. A message including the measurement configuration IE is called a measurement configuration message. In this case, the measurement configuration IE may be received through an RRC connection reconfiguration message. If a measurement result satisfies a report condition within the measconfing information, the UE reports the measurement result to an eNodeB. A message including the measurement resul is called a measurement report message.

The measurement configuration IE may include measurement object information. The measurement object information is information about an object on which UE may perform measurement. The measurement object includes at least one of an intra-frequency measurement target that is the subject of intra-cell measurement, an inter-frequency measurement target that is the subject of inter-cell measurement, and an inter-RAT measurement target that is the subject of inter-RAT measurement. For example, the intra-frequency measurement target may indicate a neighbor cell having the same frequency band as a serving cell. The inter-frequency measurement target may indicate a neighbor cell having a frequency band different from that of a serving cell. The inter-RAT measurement target may indicate a neighbor cell having an RAT different from the RAT of a serving cell.

Specifically, the measurement configuration IE includes an IE, such as that of Table 3.

TABLE 3

MeasConfig ::=
-- Measurement objects
 measObjectToRemoveList
 measObjectToAddModList
-- Other parameters
 measGapConfig The Measurement objects IE includes measObjectToRemoveList indicative of a list of measObject to be removed and measObjectToAddModList indicative of a list that may be newly added or modified.

Further, the measGapConfig is used in setting or releasing a measurement gap (MG). The measurement gap is a section for performing identification of cells on the frequency other than that of the serving cell and measuring RSRP.

The measObject includes MeasObjectCDMA2000, MEasObjectEUTRA, and MeasObjectGERAN depending on the communication technology.

Further, MeasObjectEUTRA IE includes information which is applied for intra-frequency or inter-frequency for E-UTRA cell measurement. The MeasObjectEUTRA IE may be shown as a table as follows.

TABLE 4

| Description of MeasObjectEUTRA field |
|---|
| Description of MeasObjectEUTRA field | carrierFreq
This configuration identifies a valid E-UTRA carrier frequency.
neighCellConfig
indicates information about the configuration of a neighbor cell.
measCycleSCell
parameter: $T_{measure\_sec}$
According to this parameter, a secondary cell (SCell) operates in a frequency indicated by measObject, and this parameter is used in a deactivated state.
measSubframeCellList
This is a list of cells to which measSubframePatternNeigh is applied. If this is not included, UE applies a time domain measurement resource restriction pattern to all neighbor cells.
measSubframePatternNeigh
This is a time domain measurement resource restriction pattern applied to measure RSRP and RSRQ on neighbor cells on a carrier frequency indicated by the carrierFreq.

The UE 100 also receive a radio resource configuration IE, as illustrated in FIG. 10.

The radio resource configuration IE is used to configure/modify/release a radio bearer or to modify a MAC configuration. The radio resource configuration IE includes subframe pattern information. The subframe pattern information is information about a measurement resource restriction pattern on a time domain in order to measure the RSRP, RSRQ of a serving cell (e.g., primary cell).

Figure 11:
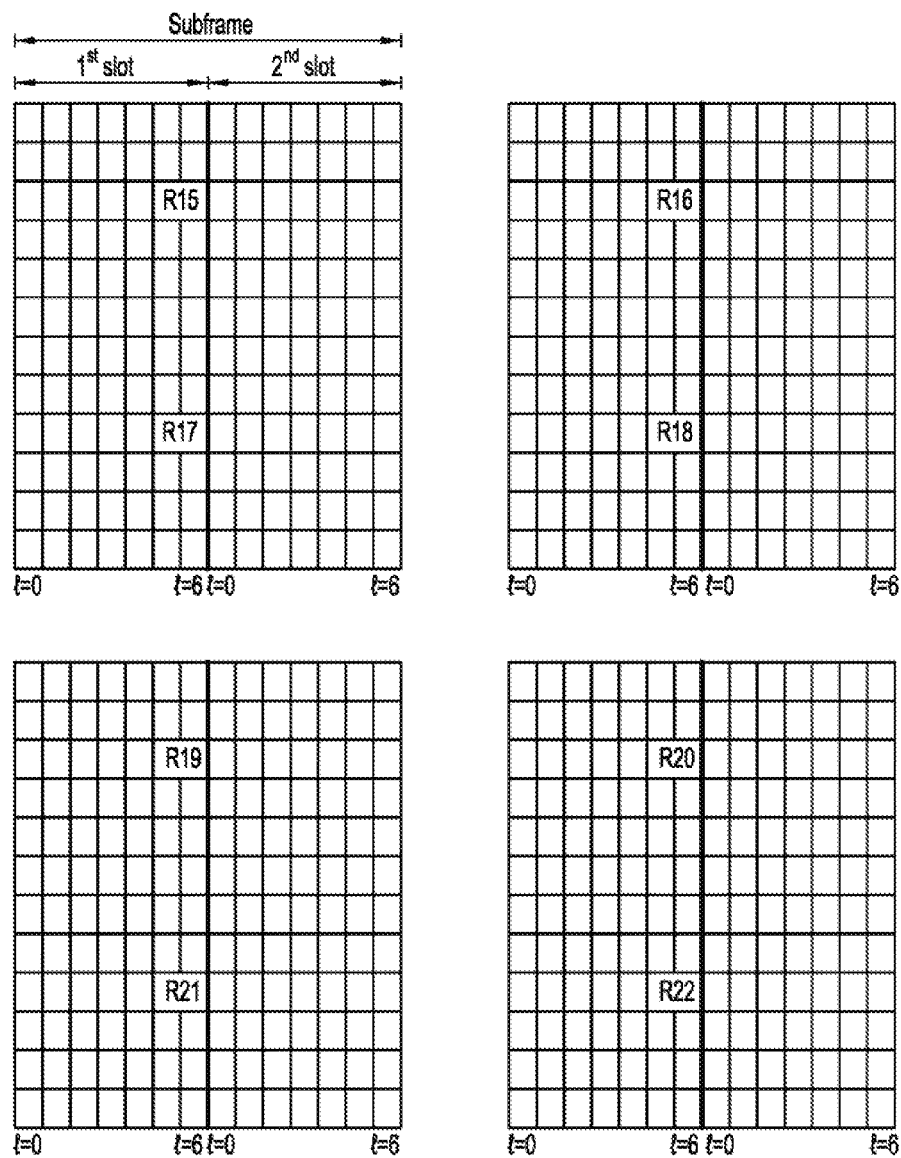
FIG. 11 illustrates an example of RBs to which CSI-RSs are mapoped in reference signals.

FIG. 11 Illustrates an Example of RB where CSI-RS is Mapped Among Reference Signals.

CSI-RS is used in channel estimation for PDSCH of LTE-A UE and channel measurement for channel information generation. CSI-RS is relatively, sparsely arranged in the frequency domain or time domain and may be punctured in the data region of the MBSFN subframe. CQI, PMU, RI, etc. may be reported from the UE when needed through estimation of CSI.

CSI-RS is transmitted through 1, 2, 4, or 8 antenna ports. The antenna ports, which are used at this time, are p=15, p=15, 16, p=15, . . . , 18, and p=15, . . . , 22. That is, the CSI-RS may be transmitted through 1, 2, 4, and 8 antenna ports. The CSI-RS may be defined for only sub-carrier interval Δf=15 kHz. The CSI-RS is explained in section 6.10.5 of 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)".

In the CSI-RS transmission, in order to reduce inter-cell interference (ICI) in the multi-cell environment including the heterogeneous network (HetNet) environment, a maximum of 32 different configurations may be suggested. The CSI-RS configuration is different depending on the CP and the number of antenna ports within the cell, and the adjacent cell may have a different configuration to the maximum extent. Further, CSI-RS configuration may be divided into the case which is applied to both FDD frame and TDD frame depending on the frame structure and the case which is applied to only TDD frame. In one cell, a plurality of CSI-RS configurations may be used. 0 or 1 CSI-RS configuration may be used for the UE which assumes non-zero power CSI-RS, and 0 or several CSI-RS configurations may be used for the UE which assumes zero-power CSI-RS.

Further, FIG. 11 shows resource elements which are used for CSI-RS when the CSI-RS configuration index is 0 in the normal CP structure. Rp shows resource elements which are used in CSI-RS transmission on antenna port p. Referring to FIG. 11, CSI-RS for antenna ports 15 and 16 is transmitted through resource elements corresponding to the third sub-carrier (sub-carrier index 2) of $6^{th}$ and $7^{th}$ OFDM symbols (OFDM symbol indexes 5 and 6) of the first slot. CSI-RS for antenna ports 17 and 18 is transmitted through the resource elements corresponding to the $9^{th}$ sub-carrier (sub-carrier index 8) of $6^{th}$ and $7^{th}$ OFDM symbols (OFDM symbol indexes 5 and 6) of the first slot. CSI-Rs for antenna ports 19 and 20 is transmitted through the same resource element where CSI-RS for antenna ports 15 and 16 is transmitted, and CSI-RS for antenna ports 21 and 22 is transmitted through the same resource element where CSI-RS for antenna ports 17 and 18 is transmitted.

If CSI-RS is transmitted to the UE through 8 antenna ports, the UE will receive RB to which R15 to R22 has been mapped. That is, CSI-RS having a specific pattern will be received.

Hereinafter, small cells will be described.

<Introduction of Small Cells>

Further, a next-generation mobile communication system, it is expected that the small cell with the cell coverage radius is to be added within the existing cell coverage, and it is expected that small cells will handle more traffic. The existing cell is greater than the small cells in the coverage and thus the existing cell is also called a macro cell, which will be explained with reference to FIG. 7.

Figure 12:
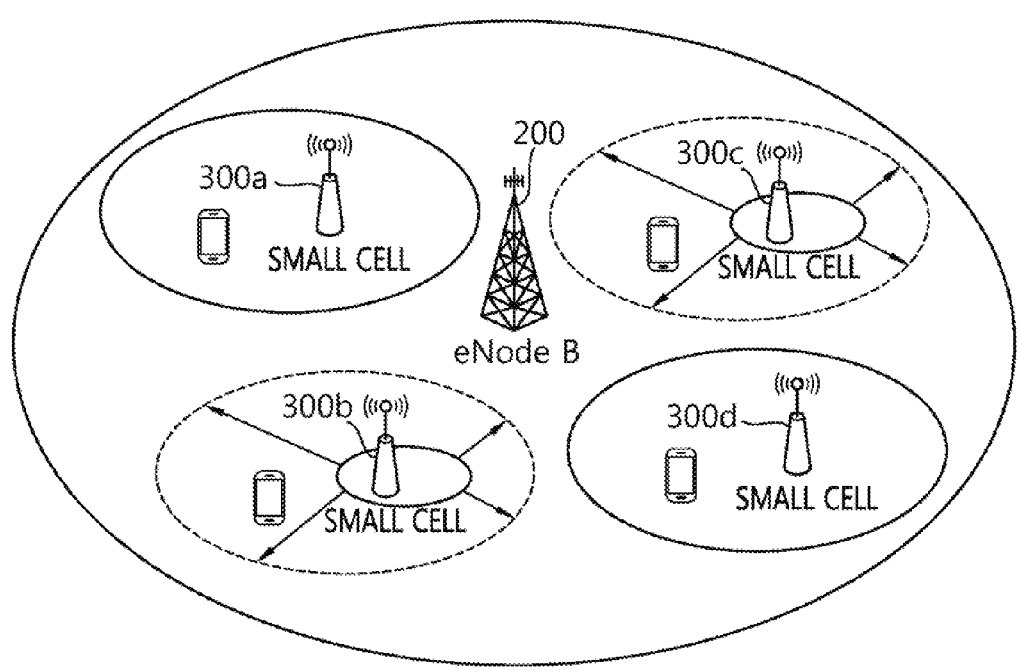
FIG. 12 is a diagram illustrating a heterogeneous network environment in which a macro cell and small cells having a possibility that they may become a next-generation wireless communication system are mixed.

FIG. 12 Illustrates a Heterogeneous Network Environment where Macro Cells and Small Cells with the Possibility that May Become a Next-Generation Wireless Communication System are Mixed.

Referring to FIG. 12, the macro cell by the existing eNB 200 shows a heterogeneous environment which overlaps with the small cells by one or more small eNBs 300a, 300b, 300c, and 300d. The existing eNB provides a large coverage compared to the small eNB, and thus it is also called a macro eNodeB (MeNB). In the present specifically, both expressions "macro cell" and "macro eNB" will be used. The UE, which is connected to the macro cell 200, may be referred to as the macro UE. The macro UE receives a downlink signal from the macro eNB and transmits an uplink signal to the macro eNB.

In such a heterogeneous network, the macro cell is set as a primary cell (Pcell) and the small cell is set as a secondary cell (Scell) so as to fill a coverage gap of the macro cell. Further, the small cell may be set to a primary cell (Pcell) and the macro cell may be set to a secondary cell (Scell), thereby improving the overall performance.

Further, the inter-cell interference problem may become more serious as the small-scale cell is arranged. In order to solve this problem, the coverage size of the small cell may be reduced depending on the situation as illustrated. Or the small cell may be turned off and then be turned on again depending on the situation.

Figure 13:
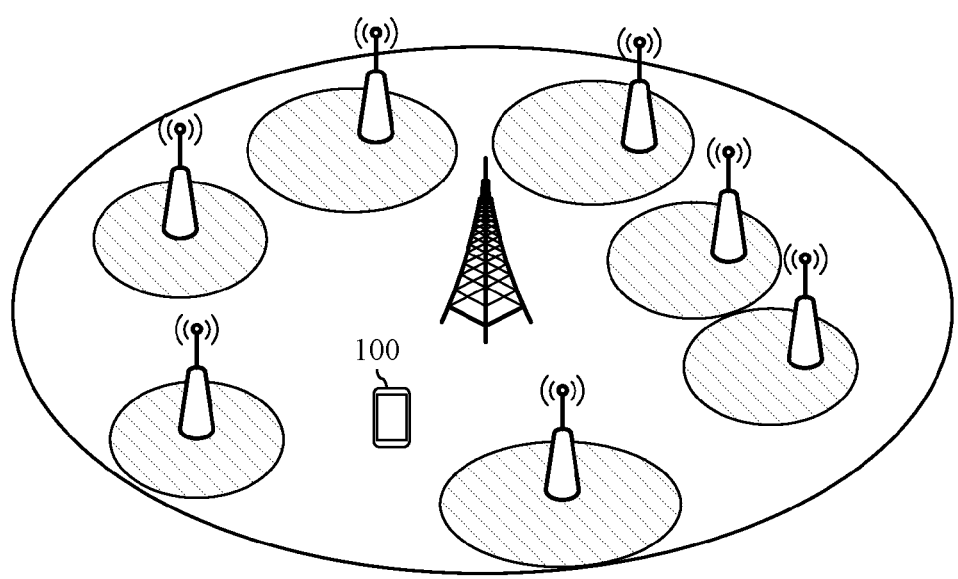
FIG. 13 illustrates a situation where small cells are densely arranged.

FIG. 13 Illustrates a Situation where Small Cells are Densely Arranged.

Referring to FIG. 13, small cells are densely arranged within the coverage of the macro cell. In such a situation, the UE 100 may have difficulty in detecting the small cells within short time. In particular, as explained above, the cell detection is performed through reception of PSS/SSS. However, if a large number of small cells are transmitted at the same timing, that is, are transmitted on subframes 0 to 5, the UE 100 may have difficulty in receiving all of them at one time. In addition, if small cells transmits PSS/SSS on subframes 0 to 5 at the same time, interference occurs, thereby generating difficulty in appropriate reception of the UE 100.

In order to solve this problem, small cells may transmit a new discovery signal (DS) in addition to the existing PSS/SS, which will be described below with reference to FIG. 14.

Figure 14:
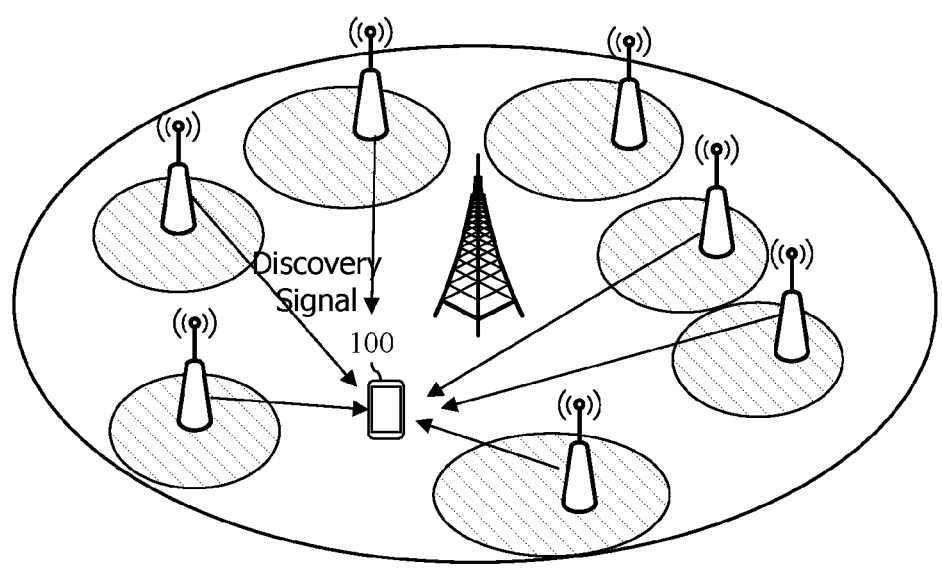
FIG. 14 is an exemplary diagram illustrating the situation in which small cells have been densely deployed.

FIG. 14 Illustrates an Example where a Small Cell Transmits a Discovery Signal.

As shown from FIG. 14, in order for the UE to efficiently detect small cells, the small cells may transmit a new discovery signal (DS) in addition to the existing PSS/SSS. The discovery signal may be periodically transmitted even by the small cell in the off state.

The discovery signal (DS) may also be called a discovery reference signal. As such, the UE needs to a cell search procedure or cell detection procedure by using a search signal (DS) in addition to the existing PSS/SSS.

Figure 15:
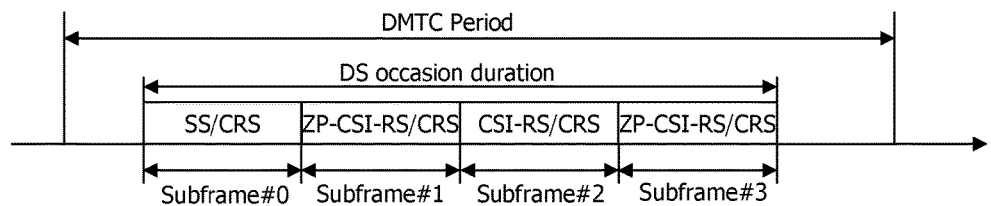
FIG. 15 illustrates an example in which small cells send discovery signals according to the disclosure of this specification.

FIG. 15 shows a discovery signal.

As shown from FIG. 15, a discovery signal may be the combination of the following.

CRS of antenna port 0 during DwPTS of all downlink subframes and special subframes,
 In frame type 1 for FDD, PSS on the first subframe of the period, or in frame type 2 for TDD, PSS on the second subframe of the period,
 SSS on the first subframe within the period,
 CSI-RS of none-zero power on 0 or one or more subframes within the period That is, the discovery signal may be the combination of CRS, SS (i.e., PSS and SSS), and CSI-RS.

Further, as illustrated in FIG. 15, the occasion section of the discovery signal may be as follows.

In frame type 1 for FDD, 1 to 5 continuous subframes
 In the subframe for TDD, 2 to 5 continuous subframes Further, the UE may receive a discovery signal measurement timing configuration (DMTC) which is the timing information for discovery signal based measurement from the eNB. The DMTC may be received in the form of MeasDS-Config field which is shown on the table below. The MeasDS-Config may be included in the measurement objects on Table 3 so as to be received. That is, MeasDS-Config field where DMTC is defined may be included in the measurement objects within the MeasConfig of Table 3 so as to be received.

The UE does not consider that the discovery signal is transmitted on the undefined subframe.

TABLE 5

Description of MeasDS-Config field csi-RS-IndividualOffset
CSI-RS individual offset which may be applied to specific CSI-RS resource
dmtc-PeriodOffset
It indicates DMTC periodicity and DMTC offset for a given frequency. The DMTC period may be 40 ms, 80 ms, or 160 ms. DMTC offset is expressed as the number of subframes. The section of DMTC occasion is 6 ms.
ds-OccasionDuration
It indicates the occasion section of the discovery signal for a given frequency. The occasion section of the discovery signal is common for all cells which transmit a discovery signal on a given frequency.

TABLE 5-continued

Description of MeasDS-Config field physCellId
It indicates a physical cell ID. UE assumes that CSI-RS and PSS/SSS/ CRS corresponding to the physical cell is the quasi co-located for the average delay and Doppler movement.
resourceConfig
It indicates CSI-RS setting.
subframeOffset
It indicates the subframe offset between CSI-RS resource and SSS of the cell which is identified by the physical ell ID within the discovery signal occasion.

In the above table, DMTC periodicity may indicate one of 40 ms, 80 ms, and 160 ms as the measuring period. According thereto, for example, the UE may perform measurement based on the discovery signal for every 160 ms. The ds-OccasionDuration is a generation section of a discovery signal. In the case of FDD, an appropriate number of subframes is indicated among 1 to 5 continuous subframes, and in the case of TDD, an appropriate number of subframes is indicated among 2 to 5 continuous subframes. The section of the DMTC occasion is the measuring performance period. For example, when the DMTC periodicity is 160 ms and the section of the DMTC occasion is 6 ms, the UE measures the discovery signal from small cells for every 160 ms for 6 ms.

The technology about small cells until now is as follows.

A search signal and a measuring section have been newly defined for cell identification and measurement of small cells. In order to identify and measure small cells, the UE uses discovery signal measurement timing configuration (DMTC) information which is received from the serving cell. The occasion section of the DMTC is 6 ms, and the period of DMTC is one of 40 ms, 80 ms, and 160 ms. That is, the UE performs the operation of detecting and measuring small cells within 6 ms which is the DMTC occasion section. According to the occasion section of the discovery signal (DS), the discovery signal (DS) may be received on 1 to 5 continuous subframes in the case of FDD and may be received on 2 to 5 continuous subframes in the case of TDD. SSS and CRS are received on the first subframe among the subframes, and in the case of FDD, PSS is further received. In the case of TDD, PSS is received on the second subframe among the subframes.

The small cells may be turned on/off. The UE cannot obtain information on whether the small cell is in the on state or off state in advance, and thus the cell is detected and measured by always using the discovery signal irrespective of the on/off state of the small cell.

The usage of the discovery signal is the acquisition of the synchronization through PSS/SSS, measurement of RSRP based on CRS, acquisition of CSI-RS, and measurement of RSRP based on CSI-RS.

The occasion section of the discovery signal includes 1 to 5 continuous subframes in the case of FDD and includes 2 to 5 subframes in the case of TDD.

As explained above, in the occasion section of the discovery signal, SSS/CRS is received on the first subframe, and CSI-RS is received at a location which is placed away from SSS subframe by the subframeoffset value of Table 3.

Figure 16:
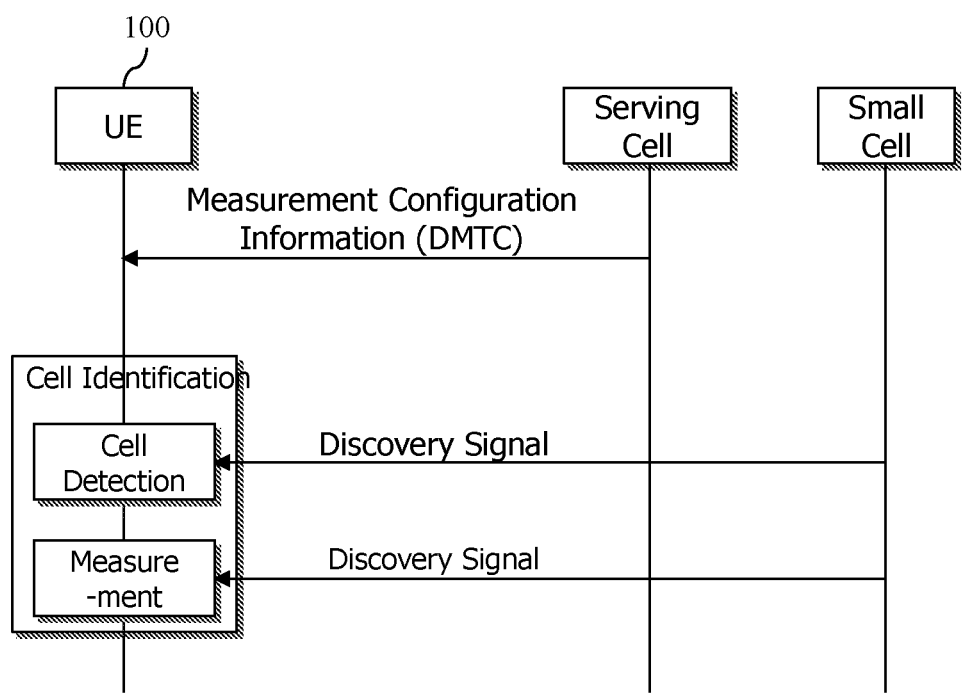
FIG. 16 illustrates a cell identification process based on a discovery signal.

FIG. 16 Illustrates a Cell Identification Process Based on a Discovery Signal.

As shown in FIG. 16, the UE 100 receives measurement setting information from the serving cell (e.g., the primary cell). Here, the measurement setting information may be measconfig which is shown on Table 3.

The measurement setting information, i.e., the measurement object within measconfig, may include discovery-signal-based timing setting (DMTC) for neighboring small cells (i.e., MeasDS-Config shown in Table 6). The DMTC, i.e., MeasDS-Config, may include DMTC periodicity, section of DMTC occasion, and information on occasion of a discovery signal, i.e., ds-OccasionDuration, as shown in Table 3.

Further, the measurement setting information, i.e., the measurement object within the measconfig, may include a measurement cycle of the deactivated secondary cell (Scell) (i.e., measCycleSCell shown in Table 4).

The UE 100 may detect small cells based on the search signal and may identify cells by performing measurement based on the discovery signal.

<License Assisted Access (LAA)>

Recently, as more communication devices require a larger communication capacity, the efficient utilization of the limited frequency band in the next generation wireless communication system is gradually becoming a more and more important requirement. The cellular communication system such as LTE system is considering to utilize unlicensed band such as 2.4 GHz which is used by the existing WLAN system or unlicensed band such as 5 GHz band, in the traffic detouring. Such an unlicensed band may be carrier-aggregated (CA) with the licensed band so as to be used. Likewise, using the unlicensed band under the support of the licensed band by the carrier aggregation is called license assisted access (LAA).

Figure 17:
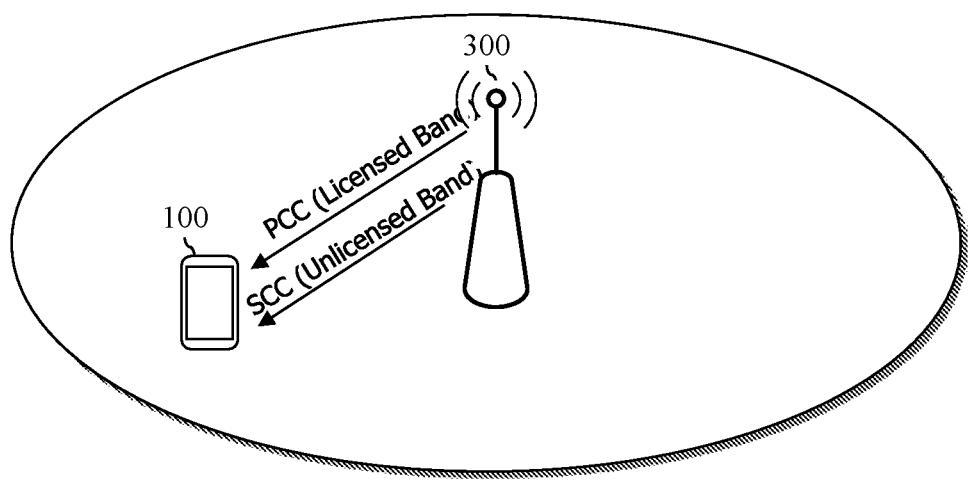
FIG. 17 illustrates using a licensed band and an unlicensed band as a carrier aggregation (CA).

FIG. 17 Illustrates an Example of Using Licensed Band and Unlicensed Band as Carrier Aggregation.

In order to transmit and receive signals through the carrier of the unlicensed band which does not guarantee the exclusive use of a certain system, as shown in FIG. 17, a small cell transmits signals to UE 100 or the UE transmits signals to the small cell 30 by using the carrier aggregation of the LTE-A band, which is the licensed band, and the unlicensed band. Here, for example, the carrier in the licensed band may be understood as a primary CC (may also be referred to as "PCC" or "PCell"), and the carrier of the unlicensed band may be understood as the secondary CC (may also be referred to as "SCC" or "SCell"). However, even in the situation where a plurality of licensed bands and a plurality of unlicensed bands are used as the carrier aggregation scheme, the above suggested schemes may be applied, and even in the situation where signals are transmitted and received between the eNB and the UE with only the unlicensed band, the schemes may be applied. Further, the suggested schemes may also be applied in systems with different features as well as 3GPP LTE system.

Further, as an example of an unlicensed band operation which is operated with a contention-based arbitrary connection scheme, an eNB 200 may perform carrier sensing (CS) before transmitting and receiving data. Likewise, performing carrier sensing (CS) before data transmission may be defined as listen before talk (LBT). At this time, the case where another communication node does not transmit signals may be defined as having been confirmed by clear channel assessment (CCA).

Figure 18A:
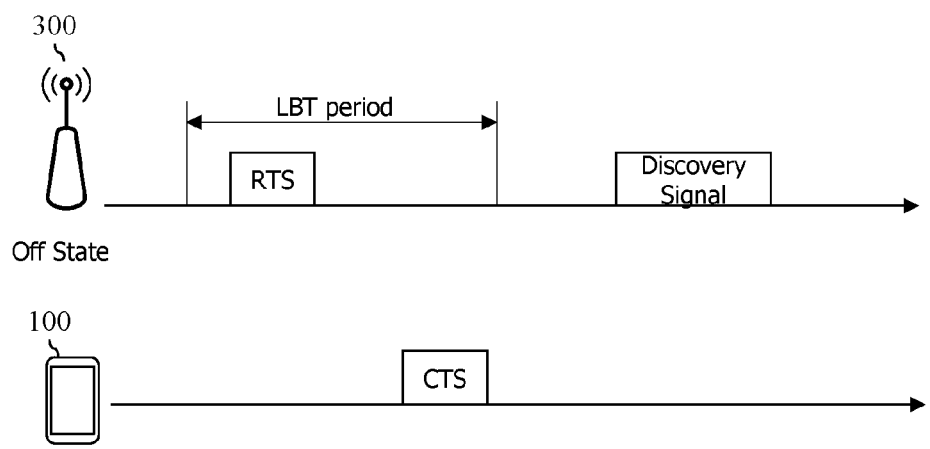
FIGS. 18A and 18B illustrate examples where a small scale cell in the off state transmits a discovery signal in an unlicensed band.
Figure 18B:
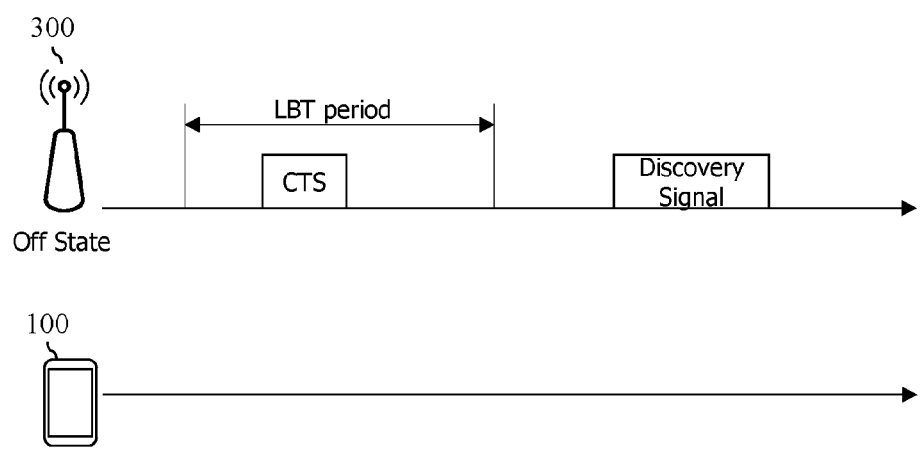

FIGS. 18A and 18B Illustrate Examples of Transmitting a Discovery Signal on an Unlicensed Band by a Small Cell in the Off State.

As illustrated in FIG. 8A, a small cell, which operates on the unlicensed band, may be turned off and may transmit a discovery signal on the unlicensed band in the off state.

However, in order to transmit the discovery signal, the small cell transmits a request to send (RTS) frame for LBT, and if the small cell receives a clear to send (CTS) frame from the UE 100 or another STA, the small cell determines that the neighboring node based on IEEE 802.11 system does not transmit a signal (i.e., determines that CCA has been confirmed) so as to transmit a discovery signal.

Further, as illustrated in FIG. 18B, the small cell determines transmits the CTS for itself and determines whether the neighboring node based on IEEE 802.11 system does not perform signal transmission (i.e., determines that CCA has been confirmed) so as to transmit a discovery signal.

However, the neighboring node of IEEE 802.11 system is transmitting signals, and thus if CCA is not confirmed, the small cell cannot transmit the discovery signal. In other words, the small cell cannot transmit a discovery signal if it is determined that the signal size of the neighboring node based on IEEE 802.11 system is a threshold or greater.

Likewise, if the discovery signal cannot be periodically transmitted and is only intermittently transmitted (e.g., the discovery signal may be absent during tens of continuous periods), the UE 100 cannot quickly identify the small cell.

Specifically, if the setting for the existing discovery signal measurement, i.e., discovery measurement timing configuration (DMTC) and DMTC period (40 ms, 80 ms, 160 ms) are considered, in LAA situation, cell identification time much longer than the existing cell identification time (e.g., 12*DMTC period+5*DMTC period) is spent.

<Suggestion of the Present Specification>

Hence, the present specification suggests a method of configuring a discovery signal for quickly identifying a small cell, i.e., a secondary cell.

That is, for efficient LAA operation, after performing LBT, when a discovery signal is transmitted, the discovery signal needs to be efficiently designed so that cell identification may be performed even when the UE receives a discover signal to the minimum extent (e.g., one time).

Figure 19A:
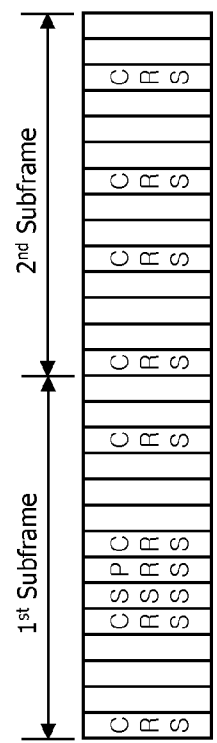
FIGS. 19A and 19B illustrate examples of a subframe including a discovery signal.
Figure 19B:
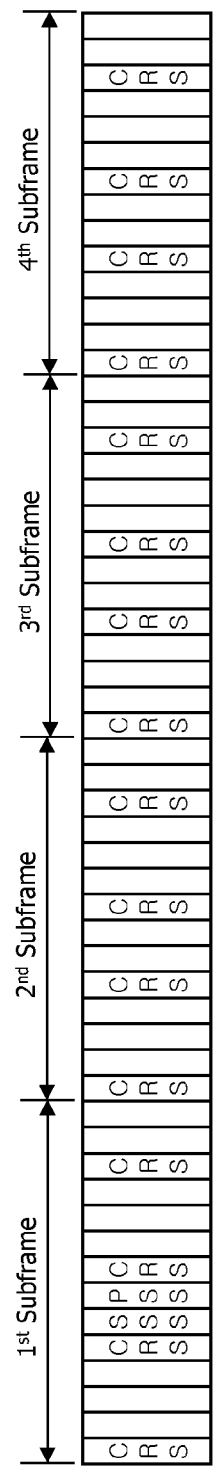

FIGS. 19A and 19B Illustrate Examples of a Subframe Including a Discovery Signal.

The cell identification time is defined as follows.

Cell identification time=cell detection time+measurement time

The UE needs to be improved so that cell detection and measurement may be performed even when the discovery signal is received to the minimum extent (e.g., one time).

Hence, when the small cell by LAA and the UE operate in the bandwidth of 10 MHz or more, if the occasion section of the discovery signal, i.e., the minimum number of subframes where the discovery signal is transmitted is 2, is it proposed that each subframe is configured as in FIG. 19A. That is, as illustrated in FIG. 19A, the first subframe within the occasion section of the discovery signal includes SSS, PSS, and CRS, and the second subframe includes CRS.

Here, the UE performs the cell sensing (including synchronization) by using the first subframe within the occasion section of the discovery signal and performs measurement (measuring of RSRP) by using the second subframe. According thereto, cell identification (including cell sensing and measuring) can be completed during the occasion section of one discovery signal, and thus it may be efficient in LAA which performs LBT.

Alternatively, when SSS and PSS exist over several subframes (e.g., the minimum 2 subframes), the cell sensing is performed on several subframes (i.e., 2 or more) including the SSS and PSS, and the measuring can be performed on 1 or more subframes where CRS exists. Here, the occasion section of the discovery signal may be 3 or more subframes. Hence, that is, the UE may complete cell identification (cell sensing and measuring) on 3 or more subframes.

Further, when the small cell by LAA and the UE operate in the 10 MHz or greater bandwidth, in the occasion section of the discovery signal, i.e., if the minimum number of subframes where the discovery signal is transmitted is 4, it is proposed that each subframe is to be configured as illustrated in FIG. 19B. That is, as illustrated in FIG. 19B, the first subframe within the occasion section of the discovery signal includes SSS, PSS, and CRS, and the second, third, and fourth subframes includes CRS.

Here, the UE may perform cell sensing (including synchronization) on the first subframe within the occasion section of the discovery and may perform measurement (RSRP, RSRP) on the second, third, and fourth subframes.

Alternatively, when the SSS and the PSS exist over several subframes (e.g., two or more subframes), the UE ma perform cell sensing on several subframes (i.e., 2 or more) including the SSS and the PSS and may perform measurement on 3 or more subframes. Here, the occasion section of the discovery signal may be 5 or more subframes. Hence, that is, the UE may complete cell identification (cell sensing and measuring) on 5 or more subframes.

Further, if it is assumed that the primary cell by LAA and the secondary cell are synchronized, it is advantageous that the subframe where there are SSS and PSS among the discovery signals of the secondary cell coincide with the subframe where the PSS and SSS of the primary cell exist. That is, if the subframes where PSS and SSS of the primary cell exist are subframes 0, 5, 10, 15, . . . , n, the subframe where SSS and PSS exist among the discovery signals of the secondary cell may also be set to become subframe 0, 10 or 5, 15. In this way, the reception complexity may be reduced in terms of implementation of the UE. This is because there is a 30.26 us receiving time difference between the primary cell and the secondary cell on the basis of the reception of the UE, and thus the complexity is reduced if the UE has 30.26 us time window on the basis of the downlink timing of the primary cell and sets the time synchronization. Otherwise, the UE needs to set time synchronization during the search signal generation section (e.g., 6 ms) of the DMTC section, and thus power consumption increases the implementation complexity increases.

Further, the summary of the above description and the additional information are as follows.

Assuming a minimum DMTC period of 40 ms, in case of small cell, one discovery signal exists during a DS occasion duration. When no DRX in use, the cell identification delay and the measurement period were specified at side condition SINR≥−6 dB as following.

$$\text{Cell identification delay} = 12 * T_{DMTC} + 5 * T_{DMTC}$$
$$\text{for } 6 \ RB \leq meas.BW < 25 \ RB$$
$$= 12 * T_{DMTC} + 3 * T_{DMTC}$$
$$\text{for } 25 \ RB \leq meas.BW$$

$$\text{Measurement period} = 5 * T_{DMTC} \text{ for } 6 \ RB \leq meas.BW < 25 \ RB$$
$$= 3 * T_{DMTC} \text{ for } 25 \ RB \leq meas.BW$$

For cell identification and measurement, many TDMTC are required in small cell.

In case of LAA, a discovery signal may not actually exist during a DS occasion duration due to LBT operation. In worst case, a discovery signal may not be transmitted during several times of DMTC. So, it is not easy to specify the requirements of cell identification time and measurement with fixed value.

Also, the following may be considered.
When assuming the same SSS/PSS of discovery signal in small cell, it is not possible to identify LAA cell within one discovery signal at SINR of −6 dB.
Measurement accuracy may be met with $3*T_{DMTC}$ in measurement BW of 5 MHz.
Measurement accuracy may be met with $1*T_{DMTC}$ in measurement BW of 10 MHz.

If the cell identification is performed within one discovery signal, the cell detection and the measurement may be met within one discovery signal. It requires SSS/PSS subframe (s) and CRS subframe(s) for one discovery signal. It is different from the legacy discovery signal in small cell. And, it also different that a discovery signal transmits or not in DMTC duration due to LBT operation. So UE needs to decide whether the discovery signal transmits or not.

Meanwhile, the inventors has performed simulations. The results are as follows:
for cell detection within one discovery signal, it is necessity to design a new discovery signal including SSS/PSS, and
for measurement within one discovery signal, $3*T_{DMTC}$ is needed in measurement BW of 5 MHz and $1*T_{DMTC}$ is needed in measurement BW of 10 MHz.

Here, it is also considered about whether an implementation margin to be needed or not. Because, taking the implementation margin into consideration, it is not possible to complete cell identification during one discovery signal. However, excluding the implementation margin is not desirable for specifying the requirement.

The above results of the simulations may be summarized as below.

Result 1: When assuming the discovery signal in small cell, it is not possible to identify LAA cell within one discovery signal at SINR of −6 dB.

Result 2: Measurement accuracy could be met with 3*TDMTC and 1*TDMTC in measurement BW of 5 MHz and 10 MHz respectively at SINR of −6 dB.

Result 3: UE does not know when a LAA discovery signal transmit or not.

Based on the results, the followings are suggested.

Proposal 1: For LAA RRM measurements requirements, side condition can be reused with that of small cell.

Proposal 2: For cell identification within one discovery signal, a new discovery signal is required.

Proposal 3: For cell identification within one discovery signal, cell detection and measurement may completed in one discovery signal.

Proposal 4: For cell identification within one discovery signal, subframe(s) of SSS/PSS/CRS and at least 1 subframe for CRS may be needed for a new discovery signal in measurement BW≥10 Mhz when assuming a discovery signal in small cell.

Proposal 5: For cell identification within one discovery signal, subframe(s) of SSS/PSS/CRS and at least 3 subframes for CRS may be needed for a new discovery signal in measurement BW≥5 Mhz when assuming a discovery signal in small cell.

Proposal 6: For RRM measurements, UE needs to decide whether a discovery signal transmits or not.

The above described embodiments of the present invention may be implemented through various means. For example, the embodiments of the present invention may be implemented in hardware, firmware, software, and a combination thereof, which are described in detail with reference to the drawings.

Figure 20:
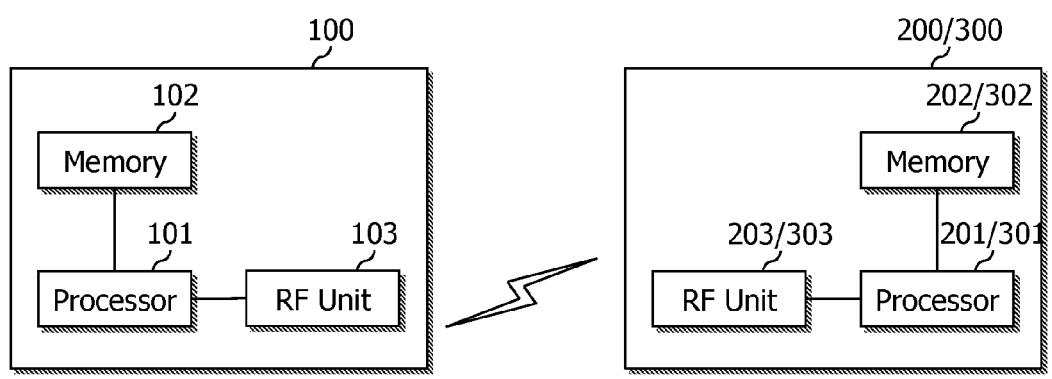
FIG. 20 is a block diagram illustrating a wireless communication system where the disclosure of the present specification is implemented.

FIG. 20 is a Block Diagram of a Wireless Communication System in which the Disclosure of the Present Specification is Implemented.

An eNB 200/300 includes a processor 201/301, a memory 202/302, and an RF unit 203/303. A memory 202/302 is connected to a processor 201/301 and saves various information for operating the processor 201/301. The RF unit 203/303 is connected to the processor 201/301 and transmits and/or receives a wireless signal. The processor 201/301 implements the suggested function, process, and/or method. In the above described embodiments, the operation of the eNB may be implemented by the processor 201/301.

A UE includes a processor, a memory 102, and an RF unit 103. The memory 102 is connected to the processor 101 and saves various information for operating the processor 101. The RF unit is connected to the processor 101 and transmits and/or receives a wireless signal. The processor 101 implements the suggested function, process, and/or method.

The processor may includes an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving, by a user equipment (UE), a discovery signal from a license assisted access (LAA) based cell operating in an unlicensed band, the method comprising:
   receiving a discovery signal measurement timing configuration (DMTC) including information on a periodicity of the DMTC and information on an occasion duration of a discovery signal;
   performing a cell detection for the LAA based cell operating in the unlicensed band, on the occasion duration; and
   performing measurements for the LAA based cell operating in the unlicensed band, on the occasion duration,
   wherein if the UE operates in a bandwidth of 10 MHz or more, the occasion duration includes a first subframe and a second subframe, the cell detection is performed in the first subframe of the occasion duration, and the measurements are performed in the second subframe of the occasion duration, and
   wherein if the UE op rates in a bandwidth of 5 MHz, the occasion duration includes the first subframe and at least three third subframes, the cell detection is performed in the first subframe of the occasion duration, and the measurements are performed in the at least three third subframes of the occasion duration.

2. The method of claim 1, wherein the cell detection and the measurements are completed for one duration defined by the information on the occasion duration.

3. The method of claim 1, further comprising
performing a cell identification based on the cell detection and the measurements for one duration defined by the information on the occasion duration.

4. The method of claim 1, wherein if the UE operates in the bandwidth of 10 MHz or more, the first subframe of the occasion duration includes a primary synchronization signal (PSS), a secondary synchronization signal (SSS) and a cell-specific reference signal (CRS), and
the second subframe of the occasion duration includes the CRS.

5. The method of claim 1,
wherein if the UE operates in the bandwidth of 5 MHz, the at least three third subframes includes three subframes,
the first subframe includes at least one of a primary synchronization signal (PSS), a secondary synchronization signal (SSS) and a cell-specific reference signal (CRS), and
the three subframes include the CRS.

6. The method of claim 5, wherein the measurements for the LAA based cell are performed on the three subframes.

7. The method of claim 1,
wherein a subframe on which a primary synchronization signal (PSS) and a secondary synchronization signal (SSS) of the discovery signal are received from the LAA based cell is time-aligned with a subframe on which a PSS and a SSS are received from a primary cell.

8. A user equipment (UE) for receiving a discovery signal from a license assisted access (LAA) based cell operating in an unlicensed band, the UE comprising:
a transceiver configured to receive a discovery signal measurement timing configuration (DMTC) including information on a periodicity of the DMTC and information on an occasion duration of a discovery signal; and
a processor configured to:
perform a cell detection for the LAA based cell operating in the unlicensed band, on the occasion duration, and
perform measurements for the LAA based cell operating in the unlicensed band, on the occasion duration,
wherein if the UE operates in a bandwidth of 10 MHz or more, the occasion duration includes a first subframe and a second subframe, the cell detection is performed in the first subframe of the occasion duration, and the measurements are performed in the second subframe of the occasion duration, and
wherein if the UE operates in a bandwidth of 5 MHz, the occasion duration includes the first subframe and at least three third subframes, the cell detection is performed in the first subframe of the occasion duration, and the measurements are performed in the at least three third subframes of the occasion duration.

9. The UE of claim 8, wherein the cell detection and the measurements are completed for one duration defined by the information on the occasion duration.

10. The UE of claim 8, wherein the processor is further configured to:
perform a cell identification based on the cell detection and the measurements for one duration defined by the information on the occasion duration.

11. The UE of claim 8, wherein if the UE operates in the bandwidth of 10 MHz or more, the first subframe of the occasion duration includes a primary synchronization signal (PSS), a secondary synchronization signal (SSS) and a cell-specific reference signal (CRS), and
wherein the second subframe of the occasion duration includes the CRS.

12. The UE of claim 8,
wherein if the UE operates in a bandwidth of 5 MHz, the at least three third subframe includes three subframes,
the a first subframe of the at least 4 subframes includes at least one of a primary synchronization signal (PSS), a secondary synchronization signal (SSS) and a cell-specific reference signal (CRS), and
the three subframes include the CRS.

13. The UE of claim 12, wherein the measurements for the LAA based cell are performed on the three subframes.

14. The UE of claim 8, wherein the processor is further configured to:
assume that a subframe on which a primary synchronization signal (PSS) and a secondary synchronization signal (SSS) of the discovery signal are received from the LAA based cell is time-aligned with a subframe on which a PSS and a SSS are received from a primary cell.

* * * * *